May 28, 1929.　　　C. A. KIEL　　　1,714,563
FLEXIBLE BALL AND SOCKET PIPE JOINT
Filed Aug. 6, 1926　　2 Sheets-Sheet 1
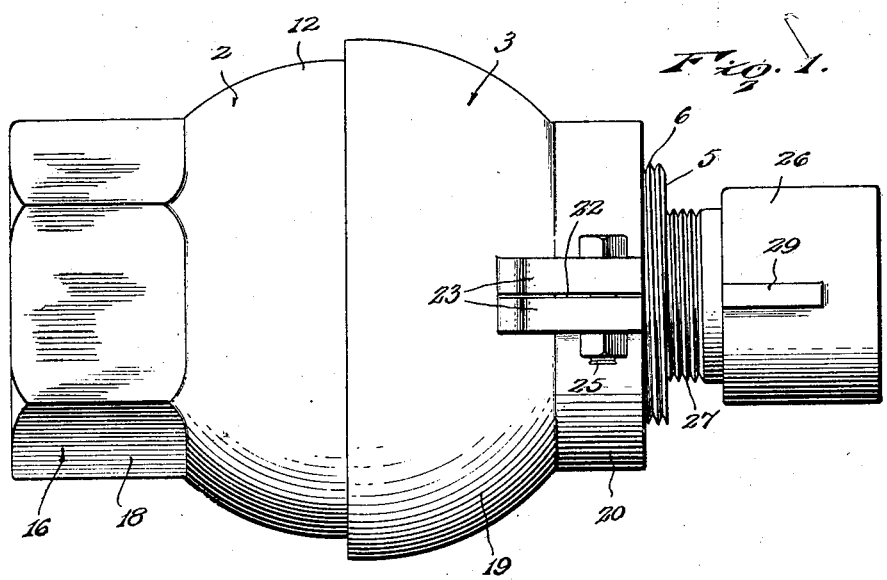
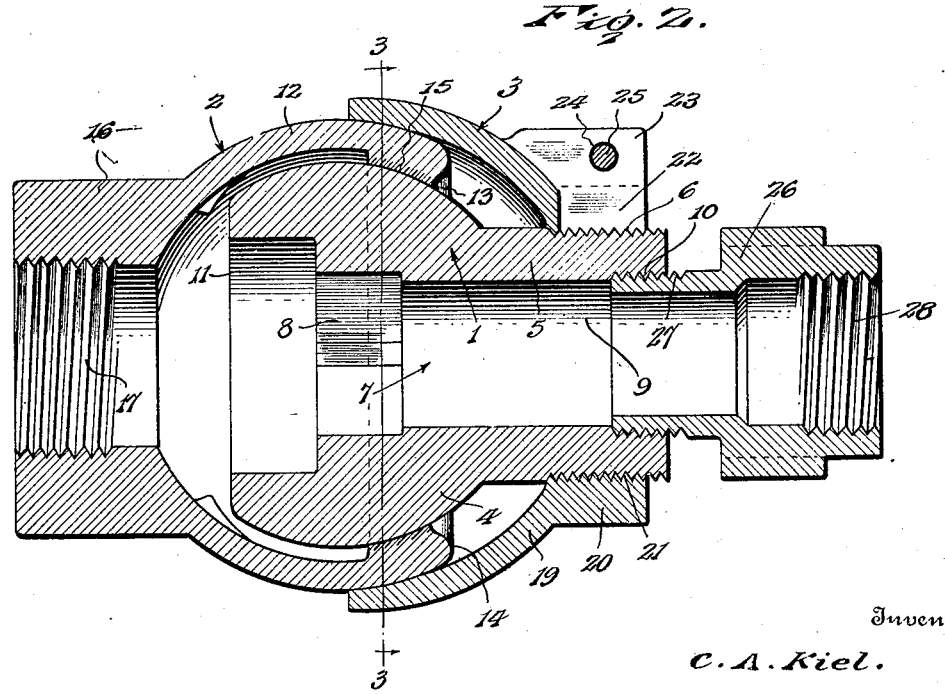
Inventor
C. A. Kiel.
By Lacey & Lacey, Attorneys

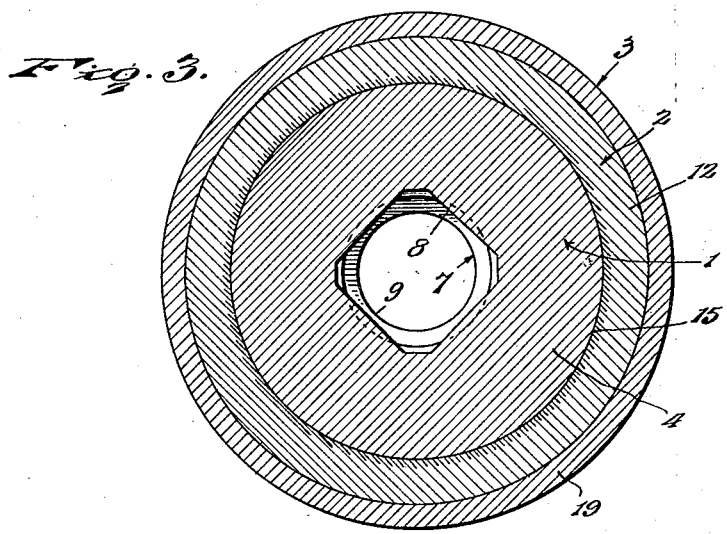
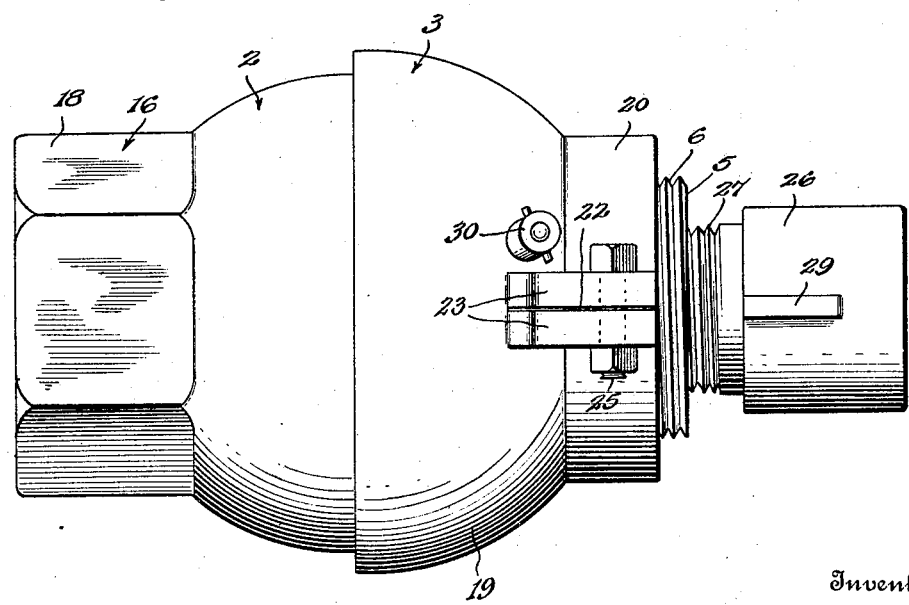

Patented May 28, 1929.

1,714,563

UNITED STATES PATENT OFFICE.

CLEMENS A. KIEL, OF LOUISVILLE, KENTUCKY.

FLEXIBLE BALL-AND-SOCKET PIPE JOINT.

Application filed August 6, 1926. Serial No. 127,648.

This invention relates to improvements in flexible ball and socket pipe couplings and has as one of its objects to provide a pipe coupling which will be fluid-tight under all conditions of use and positions of adjustment and in which a more accurate fitting of the ball to its socket is obtained than in the ordinary coupling of this type.

Another object of the invention is to provide a pipe coupling of the type referred to, so constructed that the ball of the coupling or joint will be held firmly to its seat within the socket of the joint regardless of any stresses which may be imposed upon the joint, in use, which would otherwise tend to displace the ball with respect to its seat.

Another object of the invention is to provide a pipe joint of the class referred to which will be not only fluid-tight as regards leakage of the gas or liquid being conducted therethrough, but also proof against the entrance of any foreign matter into the joint from the exterior thereof.

Another object of the invention is to provide a pipe joint of the flexible ball and socket type in which the ball is, at the time of manufacture of the joint, cast within the socket so that the necessity of forming the socket in separable sections with a consequent likelihood of leakage, is avoided.

Another object of the invention is to evolve a novel method by which the joint may be produced and by the carrying out of which method a precise fitting of the ball to its seat in the socket is insured.

Another object of the invention is to evolve a novel method of producing the joint in which method accurate finishing of the contacting surfaces of the ball and socket is effected without the employment of any extraneous devices or mechanisms.

Another object of the invention is to provide a pipe joint of the type referred to above, which may be effectually lubricated where this is necessary or desired.

In the accompanying drawings:

Figure 1 is a view in side elevation of a pipe coupling constructed in accordance with the present invention.

Figure 2 is a longitudinal sectional view therethrough.

Figure 3 is a vertical transverse sectional view taken substantially on the line 3—3 of Figure 2, looking in the direction indicated by the arrows.

Figure 4 is a view similar to Figure 1, illustrating a slight modification of the invention.

In order that an understanding of the invention may be had, the construction of the joint will first be described and then the method by which it is produced.

The ball of the joint is indicated in general by the numeral 1 and the socket in general by the numeral 2, and the numeral 3 indicates in general a cap which is associated with the ball 1 and coacts with the socket 2 in a manner to be presently more fully explained. The ball 1 comprises the usual body 4 having an approximately spherical contour and a neck 5 which is exteriorly threaded as indicated by the numeral 6. The ball 1 is formed with a bore 7 extending axially through its body 4 and neck 5, and for a portion of its length approximately at the center of the body 4, the bore is formed square or of any other suitable polygonal shape as indicated by the numeral 8, so that a tool or the squared end of a mandril may be fitted therein under conditions to be presently explained. The said bore between the squared portion 8 and the end of the neck 5, which portion is indicated by the numeral 9, is preferably of cylindrical form and for a portion of its length is interiorly threaded as indicated by the numeral 10, and the other end portion of the bore is of enlarged cylindrical form as indicated by the numeral 11.

The socket 2 comprises a hollow body portion 12 which is both interiorly and exteriorly of substantially spherical contour, the body having an open side indicated by the numeral 13 and having the margin of its wall at its said open side transversely rounded as indicated by the numeral 14. The open side 13 of the socket 2 is of less diameter than the diameter of the ball 4 and immediately inwardly of the said open side the body 12 of the socket is provided with an annular seat 15 for the ball, the seat being of a contour to be exactly engaged by the surface of the body 4 of the ball of the joint, and in the course of manufacture of the joint, and as will presently be more specifically explained, the wall of the body 12 of the socket at the seat 15 is of chilled steel for a portion of the thickness of the wall, so that the metal at this point is exceptionally hard and possesses exceptional wearing qualities. The socket 2 comprises, in addition to the body 12, a neck 16 which extends from the said body 12 at the side thereof opposite the open side 13, and the said neck 16 is interiorly threaded as indicated by the numeral 17 so as to accommodate the end of one of the pipes to be joined or coupled, and is exteriorly of polygonal form, as indicated by the numeral 18, so as to provide for the application of a wrench thereto in order to thread the socket onto the end of the pipe.

The shell 3 comprises a hollow body 19 which is of semi-spherical contour, interiorly, and of a diameter to adapt it to fit at its open side snugly over the body 12 of the socket 2, and in the process of manufacturing the joint, the exterior surface of the body 12 of the socket and the interior surface of the body 19 of the cap are brought to a smooth finish so that their contacting portions will fit in a fluid-tight manner, this smooth finishing of the surfaces being accomplished in a manner which will presently be described. The cap 3 further includes a short neck 20 which is interiorly threaded, as indicated by the numeral 21 so as to fit the threads 6 of the neck 5 of the ball 1, it being understood that the neck of the cap 3 is to be threaded onto the neck of the ball until the open side of the cap fits snugly over the body 12 of the socket 2. The neck 20 of the cap member 3 is formed with a slot which is indicated by the numeral 22 and this slot extends longitudinally inwardly from the outer end of the neck and substantially to the juncture of the neck with the body 19. Interiorly, the neck is provided with the threads 21 for its full length and it will be observed by reference to Figure 2, that the inner end of the slot 22 terminates several threads short of the inner end of the neck so that some of the threads are left intact and are not intersected by the said slot. The slot 22 is comparatively narrow, as will be observed by reference to Figure 1 of the drawings, and the neck 20 is provided at the opposite sides of the slot with outstanding lugs 23 having openings 24 therein through which is secured a bolt 25 and, in assembling the cap with the neck of the ball 1, the cap is threaded onto the said neck to the position shown in Figure 2 of the drawings, and with its inner surface at its open side snugly contacting the exterior surface of the socket 2, whereupon the bolt 25 is tightened, thus slightly contracting the neck 20 so as to more securely hold the same in place about the neck 5 of the ball 1 and thus insuring against any backward rotation of the neck of the cap upon the neck of the ball.

The numeral 26 indicates a bushing which is exteriorly threaded at one end as at 27 and fitted within the threaded end 10 of the bore of the neck 5 of the ball, and at its other end the bushing is interiorly threaded, as at 28, to provide for the connection of the end of the other pipe to be coupled. Exteriorly, the bushing is preferably provided with lugs 29 for the application of a wrench, or the bushing may be exteriorly of polygonal form for this purpose.

It will now be evident that when the cap 3 is threaded onto the ball, the body 4 of the ball will be drawn snugly to the seat 15 of the socket 2 and, at the same time, the cap will be drawn snugly to the socket 2, so that there will be a snug and fluid-tight fit between the ball and socket and between the cap and socket. As a consequence, there can be no leakage of gas or liquid from the coupling or joint and no water or foreign matter can enter the joint and reach the seat for the ball. Therefore, the joint embodying the invention is adapted for universal use or, in other words, may be employed submerged or upon or beneath the ground surface or suspended.

In producing the joint embodying the invention, the ball 1 is first cast or molded and the exterior surface of its body portion 4 is then machined or dressed to a smooth finish, and its neck 5 is provided with the threads 6 and 10. The next step in the method involves the formation of the socket 2 and in carrying out this step, the ball 1 is suitably supported within a mold flask and in part constitutes the core of the mold, mold sand being packed within the mold in a manner to provide a mold chamber corresponding to the contour of the said socket 2. In thus preparing the mold, an annular space is left between the wall of the mold and the body 4 of the ball 1 of a width corresponding to the seating surface 15. Molten steel is then poured into the mold and the socket is thus cast about the ball. When the molten metal is poured into the mold, a portion of the metal will fill the space referred to above and, coming in contact with the cold body 4 of the ball 1, will be instantly chilled for a portion of the thickness of the wall of the body 12, so that the metal constituting the seat 15 is of chilled steel and, therefore, exceptionally hard and wear resisting.

The next step in the method consists in applying to the surface of the body 4 of the ball an abradant, preferably in paste form, or mixed with oil, and the abradant is distributed over the surface of the said body of the ball and likewise over the seating surface 15 by rotating the ball member 1 and angularly moving the same as the abradant is applied. The ball member 1 and the socket member 2 are relatively rotated and either the ball member or the socket member, or both, are likewise angularly displaced during this movement. As a result of this operation, the contacting surfaces of the ball and seat 15 are smoothly and truly ground to exactly conform to each other in all positions of rotation and angular adjustment of the ball within its seat. At the completion of this step, the abradant is removed from the surfaces by the application thereto of some cleansing fluid such for example as gasoline, until the surfaces are bright and thoroughly cleansed.

The next step in the method consists in machining or dressing the exterior surface of the socket to a very smooth finish, this being accomplished by any of the ordinary machines capable of performing the work, and after the exterior surface of the socket body has been smoothly finished, the socket is held stationary in a chuck and a rotary mandril is fitted through the threaded bore of the neck 16 and is provided with a squared end which is fitted into the squared portion 8 of the bore 7 of the ball member 1, the cap 3 having been previously threaded onto the neck of the said ball member and tightened to bear snugly about the body 12 of the socket 2. The mandril is then rotated with the result that the contacting inner and outer surfaces of the cap 3 and socket 2 are ground to a smooth fit and a fluid-tight connection is thus provided between the parts. The joint is then ready for use.

By reference to Figure 2 of the drawings, it will be observed that the inner surface of the wall of the body 19 of the cap is spaced from the exterior surface of the body and neck of the ball member 1 and in the embodiment of the invention shown in Figure 4 of the drawings, a ball controlled lubricant filling connection, indicated by the numeral 30, is provided in the wall of the cap in position to communicate with the said space so that lubricant may be supplied to the interior of the joint to lubricate the contacting surfaces of the body of the ball and the seat 15.

It will be evident that by inserting the end of a square bar through the neck 16 of the socket member 2 and into the squared portion 8 of the bore of the ball member 1, the ball member may be held against rotation while the cap member 3 is being threaded into place or is being unthreaded from the said ball member.

It will be understood, of course, that the joint may be employed in coupling pipes regardless of the direction of flow of fluid therethrough and regardless of the pressure.

Having thus described the invention, what I claim is:

A ball and socket joint comprising a female member consisting of a hollow body and a neck extending from the body and formed with an axially extending bore communicating with the interior of the body, the body being semi-spherical and open at the opposite end thereof from the neck with its walls converging towards its open end and formed with an inwardly extending annular shoulder about its open end, the neck being adapted to be connected with a pipe, a male member consisting of a semi-spherical head received in the body of the female member in engagement with said shoulder and having a portion projecting outwardly through the open end of the body and a shank projecting outwardly from the head and formed with a bore extending axially through the shank and head and having its inner end portion enlarged and formed with flat walls to provide a wrench-receiving socket, the outer end portion of said shank being internally threaded to receive a pipe-engaging nipple and externally threaded from its outer end, and a cap consisting of a semi-spherical body fitting snugly about the open end portion of the body of said female member and extending outwardly therefrom and terminating in an internally threaded collar screwed upon said shank, the said collar being split transversely, apertured ears extending from the collar at opposite sides of the split and joined to the body portion of the cap, and a bolt passed through the ears to draw the collar tight upon the shank and lock the cap in a set position.

In testimony whereof I affix my signature.

CLEMENS A. KIEL. [L. S.]